United States Patent
Mandon et al.

(10) Patent No.: US 6,676,329 B2
(45) Date of Patent: Jan. 13, 2004

(54) CLAMPING DEVICE AND LENGTH-ADJUSTABLE TELESCOPIC POLE UTILIZING SUCH A CLAMPING DEVICE

(75) Inventors: Florence Mandon, La Murette (FR); Bernard Gatel, Renage (FR); Christophe Blin, Enghien (BE)

(73) Assignee: Skis Rossignol S.A., Voiron (FR)

( * ) Notice: Subject to any disclaimer, the term of this patent is extended or adjusted under 35 U.S.C. 154(b) by 68 days.

(21) Appl. No.: 10/022,724

(22) Filed: Dec. 20, 2001

(65) Prior Publication Data

US 2002/0076266 A1 Jun. 20, 2002

(30) Foreign Application Priority Data

Dec. 20, 2000 (FR) .............................. 00 16639

(51) Int. Cl.⁷ ................. F16B 7/04; F16B 7/10
(52) U.S. Cl. .................. 403/377; 403/109.5; 403/104; 403/344
(58) Field of Search ................. 403/377, 104, 403/109.5, 322.4, 374.5, 314, 344; 285/312, 403, 420

(56) References Cited

U.S. PATENT DOCUMENTS

| 1,041,286 A | * 10/1912 | Hoskins | 403/314 |
|---|---|---|---|
| 2,244,351 A | * 6/1941 | Venables | 403/344 |
| 2,304,343 A | 12/1942 | Diesbach | |
| 2,955,874 A | * 10/1960 | Brindley | 403/322.4 |
| 3,084,964 A | 4/1963 | Ruth | |
| 3,305,234 A | 2/1967 | Cline et al. | |
| 3,828,403 A | 8/1974 | Perrin et al. | |
| 5,154,449 A | 10/1992 | Suei-Long | |
| 5,441,307 A | 8/1995 | Quintana et al. | |

FOREIGN PATENT DOCUMENTS

| EP | 0 641 578 A1 | 8/1995 |
|---|---|---|
| EP | 0 677 663 A1 | 10/1995 |

OTHER PUBLICATIONS

Abstract of U.S. Pat. No. 4,381,585, published May 3, 1983.
Abstract of DE2632201, published Jan. 19, 1978.

* cited by examiner

Primary Examiner—Lynne H. Browne
Assistant Examiner—Ernesto Garcia
(74) Attorney, Agent, or Firm—Browdy and Neimark

(57) ABSTRACT

A clamping device for two telescopic tubes (1, 2) comprises a ring (7) which is longitudinally split and thus defines a longitudinal spacing (8) located in a plane intersecting the ring (7) longitudinally, said ring (7) being extended towards the outside by two wings (9, 11) facing each other on either side of the longitudinal spacing (8), at least one rod forming an axis (A) arranged transversely in relation to the plane and passing through the two wings (9, 11), and an arm (12) which is fixed and pivots in relation to the rod forming an axis (A), so as to make possible clamping of the ring (7) by reduction of the longitudinal spacing (8), the two wings (9, 11) being brought towards one another.

The arm (12) is divided into two branches (13, 14) each having a free end through which the rod forming an axis (A) passes, the two branches (13, 14) and also the free ends coming to lie on either side of the two wings (9, 11) of the ring (7) in order to enclose said two wings (9, 11).

19 Claims, 3 Drawing Sheets

CLAMPING DEVICE AND LENGTH-ADJUSTABLE TELESCOPIC POLE UTILIZING SUCH A CLAMPING DEVICE

The present invention relates to a clamping device for a telescopic tube.

The present invention also relates to a telescopic pole equipped with a clamping device.

Telescopic tubes nesting in one another are used for varying the length of the object they constitute. It is possible to envisage round tubes or tubes having sections of different shapes, such as oval or square sections. The use of such tubes is extensive and is envisaged for, for example, telescopic ski poles, telescopic hiking poles, tubes for bicycles (saddle, handlebars), for scooters, etc.

Telescopic poles are made up of a number of tubes with sections of different sizes, which are tightly nested and then joined together firmly. Two main clamping systems are used for effecting the locking of a round tube of greater diameter on the round tube of smaller diameter nested directly in it.

STATE OF THE ART

Two clamping systems which make it possible to compress the tube of greater diameter on the tube of smaller diameter are known: by rotating a ring, and by tilting an arm. Several systems for clamping by tilting an arm have previously been proposed, either in the form of a collar for securing and coupling pipes or uprights, or intended for telescopic poles.

U.S. Pat. Nos. 4,381,585 and 3,828,403 describe a locking device comprising a split or articulated ring. At one of the open ends of the ring, a first arm is fixed for rotation, and, at its end, an actuating arm is likewise fixed. One of the ends of the actuating arm comprises a cam which interacts with a cam surface located at the other of the open ends of the ring, when the second arm is folded down against the ring.

U.S. Pat. No. 3,305,234 also describes a clamping device comprising a longitudinally open ring. At one of the open ends, a protuberance extends essentially tangentially in relation to the ring. At the end of this protuberance, a curved arm is attached for rotation, and it has a cam interacting with a cam surface located towards the outside of the other open end of the ring.

U.S. Pat. No. 3,084,964 also describes a clamping device of the ball-joint type, comprising a longitudinally split ring passed through by a rod arranged tangentially in the region of the slit. An arm pivots at one of the ends of the rod, and it comprises, towards its pivoting axis, a cam which interacts with a plane surface positioned close to the slit.

EP 0 641 578 and U.S. Pat. No. 5,441,307 describe a clamping device of the ball-joint type intended for a telescopic pole. The clamping device comprises a longitudinally split ring. A tangentially arranged rod passes through the two walls of the slit. A curved arm is fixed to the rod and pivots between a position in which the ring is clamped and a position in which the ring is unclamped.

DE 26 32 201 describes a pole, the handle of which can be locked by virtue of a clamping device of the type with a pivoting monobloc lever having a cam in the region of its pivoting axis. The cam presses towards the top of the handle so as to compress it against the main tube of the pole.

U.S. Pat. No. 2,304,343 describes a device for clamping two telescopic tubes belonging to a lectern, comprising a longitudinally split clamping ring, two wings of which can be clamped by the pivoting of a monobloc arm. At one of its ends, the arm has two protuberances with internal means forming a cam interacting with the two wings of the ring.

EP 0 677 663 describes a clamping device with a longitudinal slit intended for retaining a tube. A pivoting arm comprises, at one of its ends, a spindle and also two lock washers bearing the means forming a cam. The spindle of the arm catches in the device, the two washers with the means forming a cam enclosing the device with the slit. Provided at the other end of the arm are two lugs which interact with two hollows which are formed on a wing arranged on both sides of the slit of the element.

A first disadvantage of these prior clamping devices is that they require a supplementary piece in the form of a shackle or of a second articulated arm. A second disadvantage is that their clamping principle is ineffective on account of the cam acting on only one of the sides of the spacing of the ring. Their assembly is complex and requires a supplementary axis of rotation perpendicular to the first axis passing through in the region of the slit. Play appears in the ball joint as the clamping device is used. Still another disadvantage is the fact that the clamping force occasionally proves to be inadequate for intensive use and for longitudinal stresses applied directly and simultaneously to both tubes.

SUMMARY OF THE INVENTION

An object of the present invention is to produce a device for clamping two telescopic tubes with simplified assembly and without the disadvantages of the clamping devices of the prior art. A second object of the present invention is to produce a telescopic pole equipped with such a clamping device.

A first problem consists in producing an effective clamping device which makes it possible to bring the two portions of the longitudinally split ring towards one another simultaneously.

A second problem is to increase the retaining and clamping forces and therefore to enlarge the contact surfaces between moving parts.

A clamping device for two telescopic tubes comprises a ring which is longitudinally split and thus defines a longitudinal spacing located in a plane intersecting the ring longitudinally, said ring being extended towards the outside by two wings facing each other on either side of the longitudinal spacing, at least one rod forming an axis arranged transversely in relation to the plane and passing through the two wings, and an arm which is fixed and pivots in relation to the rod forming an axis, so as to make possible clamping of the ring by reduction of the longitudinal spacing, the two wings being brought towards one another.

According to a first aspect of the present invention, the arm is divided into two branches each having a free end through which the rod forming an axis passes, the two branches and also the free ends coming to lie on either side of the two wings of the ring in order to enclose said two wings.

At least one of the two wings preferably has means forming a cam which interact with means forming a cam located on at least one branch of the arm. The two wings can each have an opening. The rod forming an axis can then pass through the opening of each of these two wings. In a particularly advantageous embodiment, the means forming a cam comprise at least one inclined surface arranged around the openings formed in the two wings. For this reason, these surfaces interact with at least one inclined surface located on at least one free end of the branches of the arm and around the pivoting axis.

In order to avoid any inadvertent unclamping when the ring is clamped, locking means, for example of the catch type, can be provided for securing the arm. These locking means preferably comprise a protuberance positioned on the edge of the ring in the region of the two wings, which interacts with a projection located on the arm. The projection can be positioned in the region of the internal surface of a portion connecting the two branches of the arm.

In an advantageous manner, the locking means are moreover formed by at least one lug which is located on at least one of the two branches of the arm and interacts with at least one hollow located on at least one of the two wings of the ring.

Advantageously, the arm moreover comprises at least one tab extending essentially perpendicularly to at least one of the two branches and in the region of at least one end opposite the two free ends.

According to a second aspect of the present invention, a telescopic pole for skiing or hiking comprises at least two coaxial cylindrical tubes nested one in another and is characterized by at least one clamping device, as described above, slipped around the tube or tubes having the greater diameter.

The tabs located at the end of the arm can come to lie and catch on both sides of a tube having the smaller diameter.

DESCRIPTION OF THE DRAWINGS

The invention will be clearly understood, and its advantages and various characteristics will emerge more clearly from the description given below of a non-limiting example of embodiment with reference to the accompanying diagrammatic drawing, in which.

DETAILED DESCRIPTION OF THE INVENTION

A telescopic pole intended for hiking or skiing comprises at least two tubes of different diameter, at least one clamping device for two tubes, a gripping handle (not shown) and a pointed end (not shown). A first tube 1, of greater diameter, is slipped onto a second tube 2 having an appreciably smaller diameter. The difference in diameter between the large tube 1 and the small tube 2 corresponds to essentially twice the thickness of the wall of one of the tubes.

A longitudinal slot 3 extending over a length of 1 to 3 cm is formed at one 4 of the ends and in the wall of the tube 1 of greater diameter. This longitudinal slot 3 makes it possible to clamp the tube 1 of greater diameter on the tube 2 of smaller diameter by bringing the two opposite walls of the slot 3 towards one another.

Figure 1:
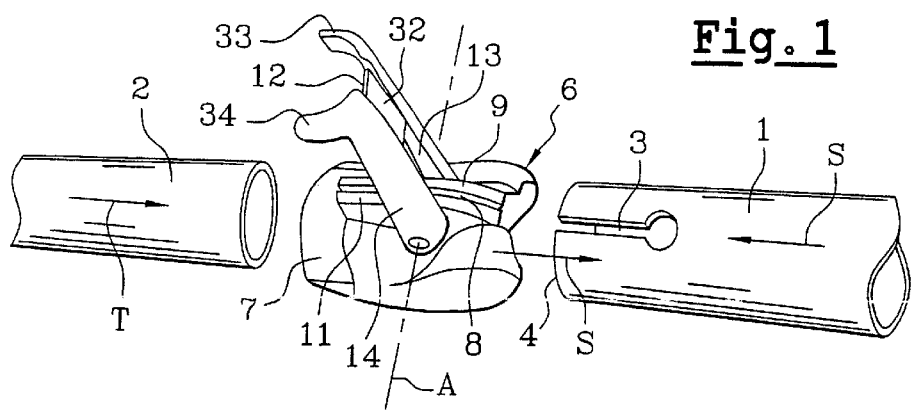
FIG. 1 shows an exploded perspective view of the top of a portion of a telescopic pole.

A clamping and locking device 6 brings about firm, reliable fixing of the two tubes 1 and 2 to one another. The clamping device 6 is slipped (arrows S in FIG. 1) onto the end 4 of the tube 1 of greater diameter, and it covers essentially the entire extent of the longitudinal slot 3.

Figure 2:
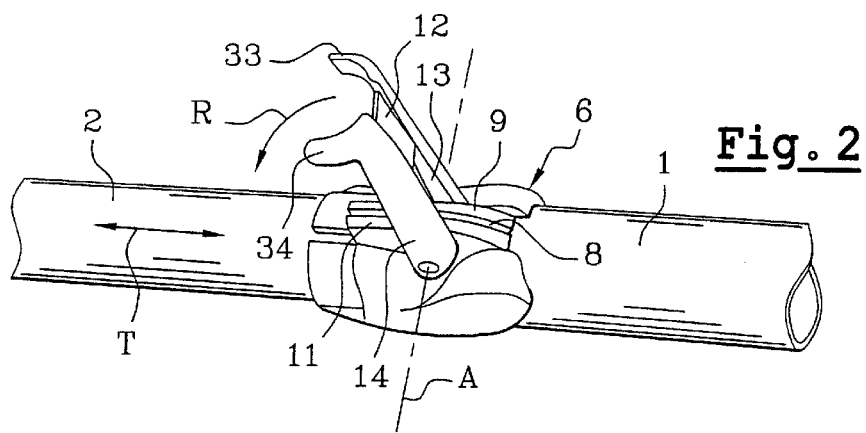
FIG. 2 shows a perspective view of the top of the portion of pole equipped with its clamping device in an unclamped position.
Figure 3:
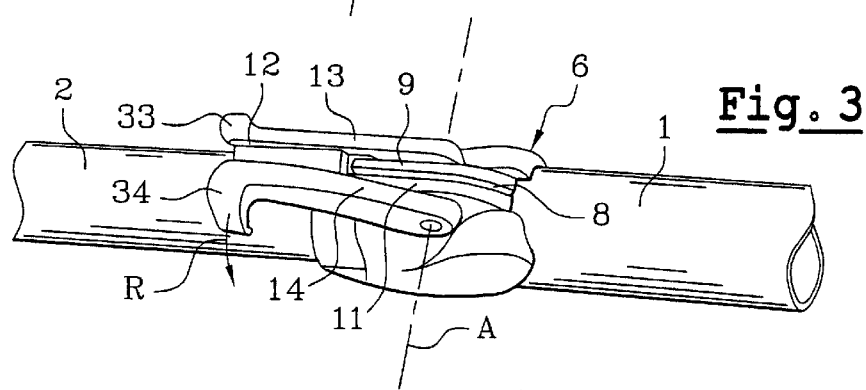
FIG. 3 shows a perspective view of the top of the portion of pole equipped with its clamping device in the course of clamping.

The user can thus slide (according to arrow T in FIGS. 1 and 2) the tube 2 of smaller diameter inside the tube 1 of greater diameter, either to set the desired height of the telescopic pole, or to collapse the telescopic pole completely. The user then secures the end 4 of the large tube 1 on the small tube 2 by virtue of the clamping device 6, in order to prevent any inadvertent displacement of the small tube 2 in relation to the large tube 1.

Figure 5:
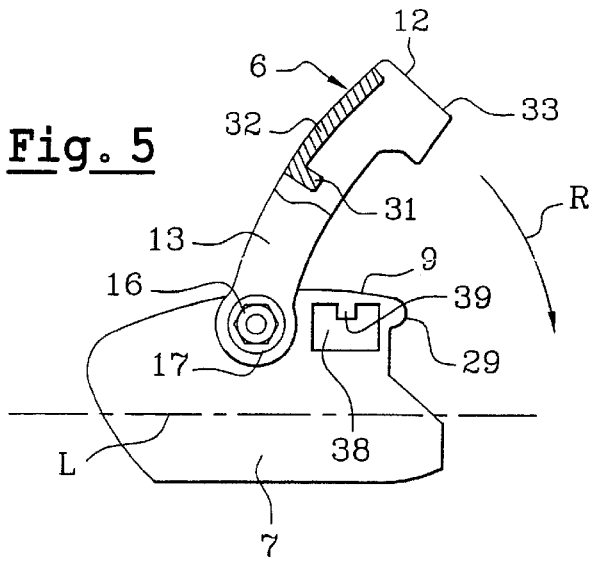
FIG. 5 shows a lateral view of a clamping device, with the end of the arm visible in a sectional view.
Figure 6:
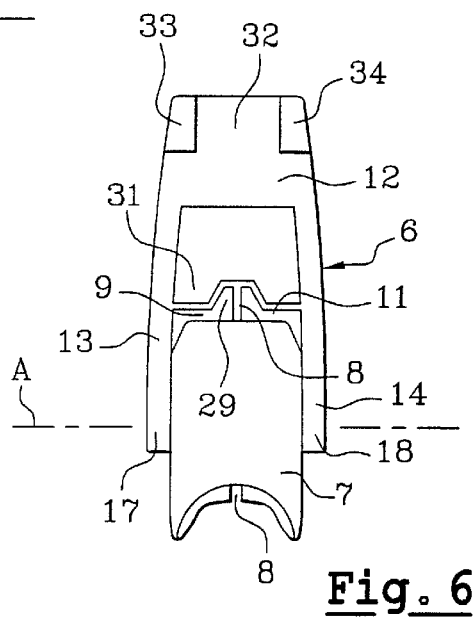
FIG. 6 shows a view of the bottom of a clamping device in a clamped position.

The clamping device 6 comprises a clamping ring 7 in the form of a cylinder which has a diameter which is essentially the same as or very slightly greater than the diameter of the large tube 1. The clamping ring 7 can thus be fitted at the end 4 of the large tube 1. In one single place, and over its entire length, this clamping ring 7 is longitudinally split, that is to say in the longitudinal direction indicated by the axis L (see FIG. 5) which corresponds to the axis of the tubes 1 and 2 once the ring 7 has been mounted. The clamping ring 7 remains all in one piece.

Figure 7:
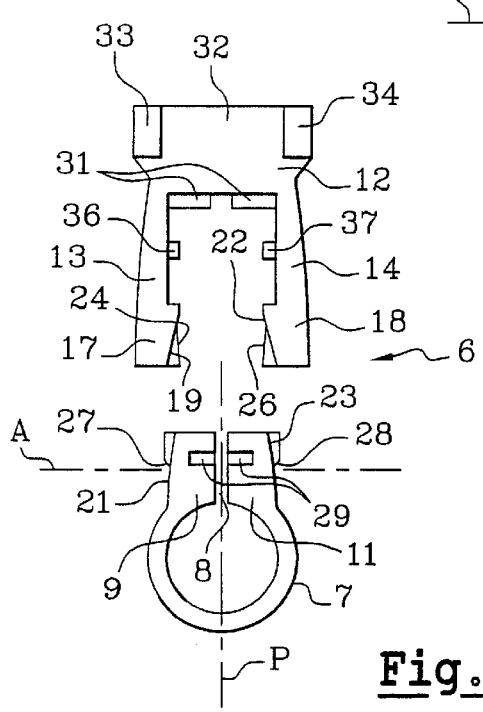
FIG. 7 shows an exploded front view of the clamping device.

On account of this longitudinal slit, the clamping ring 7 has a spacing 8, the width of which can be greater or smaller depending on whether or not clamping is effected. The spacing 8 is located in a plane P (see FIG. 7) intersecting the ring 7 longitudinally in its centre. When the ring 7 of the clamping device 6 is slipped around the tube 1 of greater diameter, the spacing 8 is positioned opposite the longitudinal slot 3 of the tube 1. This allows clamping by reduction of the width of the spacing 8 bringing about a reduction in size of the slot 3.

By virtue of the presence of this spacing 8, the ring 7 comprises two opposite walls or wings 9 and 11 facing each other. The two wings 9 and 11 are of increased thickness and both extend diametrically towards the outside of the ring 7 and on either side of the plane P. These two wings 9 and 11 extend over virtually the entire length of the spacing 8 and thus of the ring 7.

A pivoting clamping arm 12 has two separate branches 13 and 14 which come to lie respectively on either side and on the outside of the wings 9 and 11 at the end of pivoting. By virtue of these large contact surfaces between the surface of the two free branches 13 and 14 of the arm 12 and the surface of the two wings 9 and 11 of the ring 7, particularly effective clamping and retention are obtained. The two free branches 13 and 14 completely enclose the two wings 9 and 11, rendering virtually impossible moving apart of these same two wings 9 and 11, opening of the spacing 8 and thus unclamping of the ring 7. The telescopic pole with its tubes 1 and 2 proves to be particularly resistant to longitudinal impacts, without it being possible for it to collapse in an inopportune manner.

The arm 12 can pivot in relation to an axis A passing successively through the end of the first branch 13, the first wing 9, the spacing 8, the second wing 11, and lastly the end of the second branch 14 of the arm 12. This axis A is tangential to the ring 7.

In order to allow rotation in relation to the axis A, a rod or a screw and its nut 16 allow the arm 12 to be joined together with the rest of the clamping device 6. At one free, reinforced end 17 of the first branch 13, and also at one free, reinforced end 18 of the second branch 14 of the arm 12, a perforation is formed, which has a diameter which is essentially the same as the diameter of the rod forming the axis A and allows said rod to pass through. An opening, which has a diameter which is essentially the same as the diameter of the rod forming the axis A and is intended to allow said rod to pass through, is formed through the wings 9 and 11 of the ring.

Figure 4:
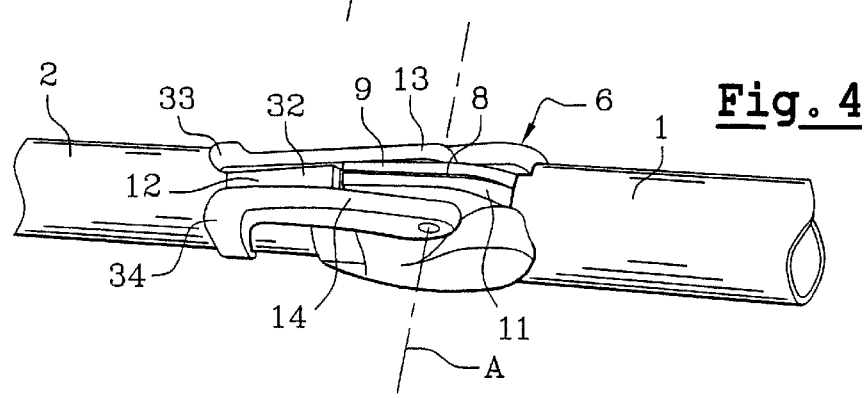
FIG. 4 shows a perspective view of the top of the portion of pole equipped with its clamping device in a completely clamped position.

The arm 12 can thus pivot in relation to the axis A along a path R and pass from an essentially vertical position essentially perpendicular to the tubes 1 and 2 of the telescopic pole (see FIG. 2) to a horizontal position essentially parallel to the tubes 1 and 2 of the telescopic pole (see FIG. 4).

In order to allow clamping, a first surface 19 forming a cam has been provided, positioned at the reinforcement of the free end 17 of the first branch 13 of the arm 12. This first surface 19 is inclined in relation to the direction of the first branch 13 and is oriented towards the inside of said branch 13. This first surface 19 will interact with a first inclined surface 21 located on the outside of the first wing 9 of the ring 7.

In the same way, a second inclined surface 22 forming a cam has been provided at the free, reinforced end 18 of the second branch 14 of the arm 12, which will interact with a second inclined surface 23 located on the outside of the second wing 11 of the ring 7. A third inclined surface 24 has also been provided at the reinforcement of the free end 17 of the first branch 13, and a fourth inclined surface 26 has been provided at the reinforcement of the free end 18 of the second branch 14 of the arm 12. The inclined surfaces 19 and 24 of the first branch 13 face the inclined surfaces 22, 26 of the second branch 14.

The third surface 24 also interacts with a third inclined surface 27 provided on the outside of the first wing 9, and the fourth inclined surface 26 also interacts with a fourth inclined surface 28 located on the outside of the second wing 11 of the ring 7. When all these inclined surfaces 19, 21, 22, 23, 24, 26, 27 and 28 are in contact with one another respectively, they make it possible, on rotation R of the arm 12, to push the wings 9 and 11 of the ring 7 towards one another and thus to clamp the ring 7. When the arm 12 is rotated in the opposite direction, all these surfaces 19, 21, 22, 23, 24, 26, 27 and 28 no longer push against one another, which allows the spacing 8 to be increased and thus the ring 7 to be released.

In order to secure the arm 12 when folded down against the tube 2, that is to say in the position in which the ring 7 is clamped, a protuberance 29 has been provided, located on the transverse face of the wings 9 and 11. The protuberance 29 is divided in two on account of the presence of the spacing 8. The protuberance 29 interacts with a projection 31 located on the arm 12. The projection 31 is arranged in a central portion 32 of the arm 12. The central portion 32 interconnects the branches 13 and 14 opposite the two free ends 17 and 18. When the clamping device 6 is clamped, the protuberance 29 lies opposite the projection 31 and will then catch after being forced past the projection 31.

It is to be noted that the central portion 32 of the arm 12 is located longitudinally beyond the two wings 9 and 11 of the clamping ring 7.

In order to secure the arm 12 when folded down against the tube 2, that is to say in the position in which the ring 7 is clamped, two supplementary tabs 33 and 34 are also provided on the two branches 13 and 14. The supplementary tabs 33 and 34 are respectively opposite the two free ends 17 and 18 of the arm 12 and in the region of the central portion 32. The two tabs 33 and 34 are perpendicular to the main axis of the two branches 13 and 14, and the two tabs are oriented in the direction of the tube when the ring 7 is clamped. Principally, the two tabs 33 and 34 make possible additional catching of the arm 12 by their force-fitting on either side of the tube 2 of smaller diameter.

These tabs 33 and 34 also make it possible to achieve an attractive appearance and/or to facilitate operation of the arm 12 in particular with gloves.

Figure 8:
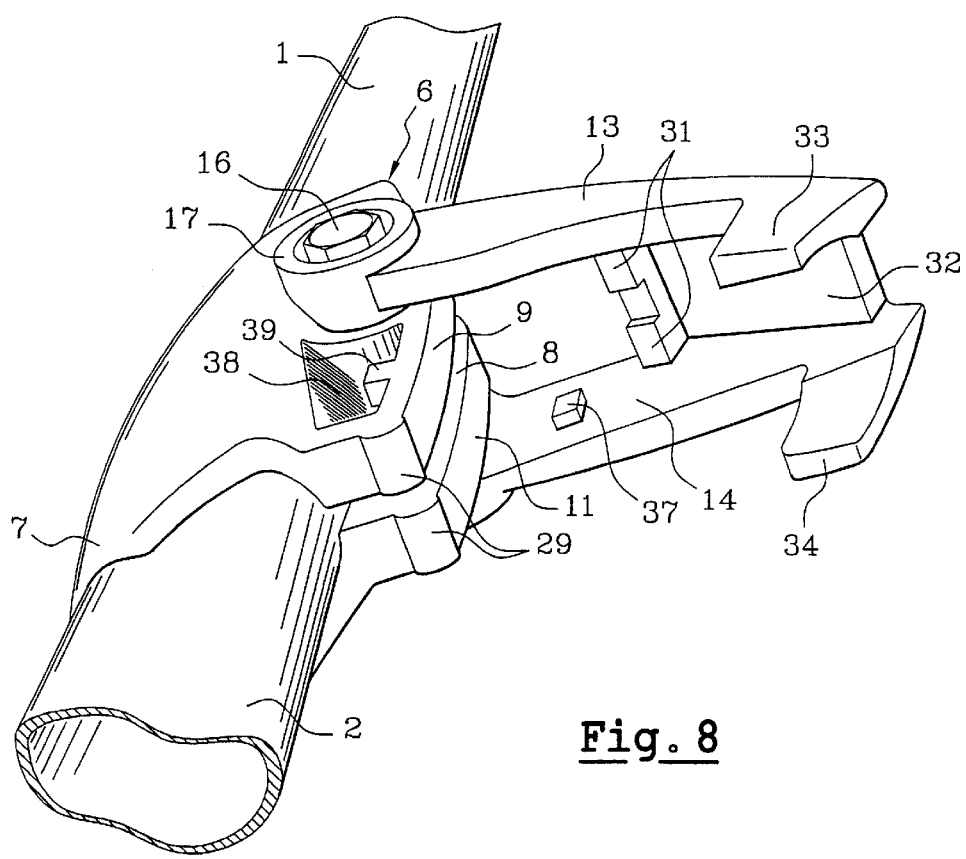
FIG. 8 shows a lateral perspective view of the portion of pole equipped with its clamping device in an unclamped position.

In order to keep the arm 12 folded down against the tube 2, that is to say in the position in which the ring 7 is clamped, two lugs 36 and 37 are added on the internal face of each of the two branches 13 and 14 of the arm 12. Each of these two lugs 36 and 37 interacts with one of two hollows 38 (only one is visible in FIGS. 5 and 8), which hollows are each located on the two wings 9 and 11 of the ring 7. When the clamping device 6 is clamped, the two lugs 36 and 37 are positioned opposite the two hollows 38 and they then catch after being forced past the two wings 9 and 11.

Two additional surfaces 39 (only one is visible in FIGS. 5 and 8) are provided, located on the external portion of each of the two wings 9 and 11. The two surfaces 39 jut out in a point in relation to the two hollows 38. As they lie on the path of the lugs 36 and 37 when the arm 12 is rotated, the lugs 36 and 37 slide on the surfaces 39 and thus make possible additional clamping of the ring 7, just before the two lugs 36 and 37 enter and catch in the hollows 38.

The present invention is not limited to the embodiments which have just been described here. The means forming a cam can be modified.

What is claimed is:

1. Clamping device for two telescopic tubes (1, 2), comprising a ring (7) which is longitudinally split and thus defines a longitudinal spacing (8) located in a plane (P) intersecting the ring (7) longitudinally, said ring (7) being extended towards the outside by two wings (9, 11) facing each other on either side of the longitudinal spacing (8), at least one rod forming an axis (A) arranged transversely in relation to the plane (P) and passing through the two wings (9, 11), and an arm (12) which is fixed and pivots in relation to the rod forming the axis (A), so as to make possible clamping of the ring (7) by reduction of the longitudinal spacing (8), the two wings (9, 11) being brought towards one another, characterized in that the arm (12) is divided into two branches (13, 14) each having a free end (17, 18) through which the rod forming the axis (A) passes, the two branches being interconnected only by a central portion (32) spaced apart from the two free ends (17, 18) and located longitudinally away from the two wings (9, 11) of the ring (7), the two branches (13, 14) and said two free ends (17, 18) coming to lie on either side of the two wings (9, 11) of the ring (7) in order to enclose said two wings (9, 11).

2. The clamping device according to claim 1, wherein at least one of the two wings cam means which interact with cam means located on at least one branch (13, 14) of the arm (12).

3. The clamping device according to claim 1 or 2, wherein the two wings (9, 11) each have an opening, and in that the rod forming the axis (A) passes through the opening of each of these two wings (9, 11).

4. The clamping device according to claim 2, wherein the cam means of the two wings comprise at least one inclined surface (21, 23, 27, 28) arranged around the openings formed in the two wings (9, 11), the at least one inclined surface (21, 23, 27, 28) interacting with at least one inclined surface (19, 22, 24, 26) located on at least one of the free ends (17, 18) of the branches (13, 14) of the arm (12) and around the axis (A).

5. The clamping device according to claim 1, wherein the device comprises locking means intended for securing the arm (12) when the ring (7) is clamped.

6. The clamping device according to claim 5, wherein the locking means comprises a protuberance (29) positioned on an edge of the ring (7) in a region of the two wings (9, 11), which interacts with a projection (31) located in a region of an internal surface of a portion (32) connecting the two branches (13, 14) of the arm (12).

7. The clamping device according to claim 5 or 6, wherein the locking means comprises at least one lug (36, 37) which is located on at least one of the two branches (13, 14) of the arm (12) and interacts with at least one hollow (38) located on at least one of the two wings (9, 11) of the ring (7).

8. The clamping device according to claim 5, wherein the arm (12) moreover comprises at least one tab (33, 34) extending essentially perpendicularly to at least one of the two branches (13, 14) and in the region of at least one end opposite the two free ends (17, 18).

9. Telescopic pole for skiing or hiking comprising at least two coaxial tubes (1, 2) nested one in another, wherein the pole comprises at least one clamping device (6) according to claim 1 or claim 2 slipped around tubes (1) having the greater diameter.

10. The telescopic pole according to claim 9, wherein the tabs (33, 34), located at the end of the arm (12), come to lie and catch on both sides of the tube (2) having the smaller diameter.

11. Clamping device for two telescopic tubes (1, 2), comprising a ring (7) which is longitudinally split and thus defines a longitudinal spacing (8) located in a plane (P) intersecting the ring (7) longitudinally, said ring (7) being extended towards the outside by two wings (9, 11) facing each other on either side of the longitudinal spacing (8), at least one rod forming an axis (A) arranged transversely in relation to the plane (P) and passing through the two wings (9, 11), and an arm (12) which is fixed and pivots in relation to the rod forming the axis (A), so as to make possible clamping of the ring (7) by reduction of the longitudinal spacing (8), the two wings (9, 11) being brought towards one another, characterized in that the arm (12) is divided into two branches (13, 14) each having a free end (17, 18) through which the rod forming the axis (A) passes, the two branches (13, 14) and said two free ends (17, 18) coming to lie on either side of the two wings (9, 11) of the ring (7) in order to enclose said two wings (9, 11), wherein at least one of the two wings has cam means which interact with cam means located on at least one branch (13, 14) of the arm (12).

12. The clamping device according to claim 11, wherein the two wings (9, 11) each have an opening, and in that the rod forming the axis (A) passes through the opening of each of these two wings (9, 11).

13. The clamping device according to claim 11, wherein the cam means of the two wings comprise at least one inclined surface (21, 23, 27, 28) arranged around the openings formed in the two wings (9, 11), the at least one inclined surface (21, 23, 27, 28) interacting with at least one inclined surface (19, 22, 24, 26) located on at least one of the free ends (17, 18) of the branches (13, 14) of the arm (12) and around the axis (A).

14. The clamping device according to claim 11, wherein the device comprises locking means intended for securing the arm (12) when the ring (7) is clamped.

15. The clamping device according to claim 14, wherein the locking means comprises a protuberance (29) positioned on an edge of the ring (7) in a region of the two wings (9, 11), which interacts with a projection (31) located in a region of an internal surface of a portion (32) connecting the two branches (13, 14) of the arm (12).

16. The clamping device according to claim 14, wherein the locking means comprises at least one lug (36, 37) which is located on at least one of the two branches (13, 14) of the arm (12) and interacts with at least one hollow (38) located on at least one of the two wings (9, 11) of the ring (7).

17. The clamping device according to claim 14, wherein the arm (12) moreover comprises at least one tab (33, 34) extending essentially perpendicularly to at least one of the two branches (13, 14) and in the region of at least one end opposite the two free ends (17, 18).

18. Telescopic pole for skiing or hiking comprising at least two coaxial tubes (1, 2) nested one in another, wherein the pole comprises at least one clamping device (6) according to claim 11 slipped around tubes (1) having the greater diameter.

19. The telescopic pole according to claim 18, wherein the tabs (33, 34), located at the end of the arm (12), come to lie and catch on both sides of the tube (2) having the smaller diameter.

* * * * *